United States Patent [19]

Aratani et al.

[11] Patent Number: 5,168,482
[45] Date of Patent: Dec. 1, 1992

[54] MAGNETOOPTICAL RECORDING AND PLAYBACK METHOD EMPLOYING MULTI-LAYER RECORDING MEDIUM WITH RECORD HOLDING LAYER AND PLAYBACK LAYER

[75] Inventors: Katsuhisa Aratani, Chiba; Atsushi Fukumoto, Kanagawa; Masumi Ohta, Tokyo, all of Japan

[73] Assignee: Sony Corporation, Tokyo, Japan

[21] Appl. No.: 574,081

[22] Filed: Aug. 29, 1990

[30] Foreign Application Priority Data

Aug. 31, 1989 [JP] Japan .................. 1-225685
Sep. 6, 1989 [JP] Japan .................. 1-229395
Sep. 6, 1989 [JP] Japan .................. 1-229396
Feb. 20, 1990 [JP] Japan .................. 2-039147

[51] Int. Cl.$^5$ ............... G11B 13/04; G11B 11/10; G11B 11/12
[52] U.S. Cl. ................................. 369/13; 360/59; 360/114; 365/122
[58] Field of Search .............. 369/13; 360/59, 114; 365/122

[56] References Cited

U.S. PATENT DOCUMENTS 3,521,294  7/1970  Treves .................................. 360/59
4,932,012  6/1990  Kobayashi ........................... 360/114
4,955,007  9/1990  Aratani et al. ..................... 360/114
5,051,970  9/1991  Ishii et al. .......................... 369/13

FOREIGN PATENT DOCUMENTS 0258978  3/1988  European Pat. Off. .
0291248  11/1988  European Pat. Off. .
0318925  6/1989  European Pat. Off. .
1-112505  5/1989  Japan .

OTHER PUBLICATIONS

"Dual-Film Disk Hikes Magneto-Optic Density", 8032 Electronics, 59 (1986) Jun., No. 25, pp. 24-25.

Primary Examiner—Hoa Nguyen
Attorney, Agent, or Firm—Hill, Van Santen, Steadman & Simpson

[57] ABSTRACT

A high density magnetooptical recording and playback method is disclosed. The magnetooptical recording medium comprises a recording hold magnetic layer and a playback magnetic layer magnetically coupled with each other. Prior to the playback operation, the playback magnetic layer is initialized by an external magnetic field. A laser light is irradiated to locally heat the medium and cause transfer of magnetization in the recording hold magnetic layer to the playback magnetic layer. The signal is read out by the interaction of the laser light and the transferred magnetization.

5 Claims, 11 Drawing Sheets

MAGNETOOPTICAL RECORDING AND PLAYBACK METHOD EMPLOYING MULTI-LAYER RECORDING MEDIUM WITH RECORD HOLDING LAYER AND PLAYBACK LAYER BACKGROUND OF THE INVENTION

The present invention relates to a magnetooptical recording and playback method for high density recording.

The magnetooptical recording system is based on the basic principle that a magnetic thin film is locally heated to a temperature exceeding the Curie temperature or a compensation temperature so that the coercive force of the heated portion is decreased and so that the magnetization direction thereof is reversed in the direction of the external recording magnetic field. Thus, the known magnetooptical recording medium is constructed by forming, on one main surface of a transparent base made of, for example, polycarbonate resin, a recording magnetic layer (for example, rare earth element-transition metal amorphous alloy thin film) having an easy axis of magnetization perpendicular to the film surface and an excellent magnetooptical effect, a reflecting layer and a dielectric layer as a lamination to provide a recording portion, the signal recorded on the recording portion being read by the irradiation of laser light from the transparent base side.

By the way, the recording density of not only the magnetooptical recording medium but also the optical disc such as the digital audio disc (the so-called compact disc) and the video disc is determined chiefly by the S/N ratio upon playback, and the amount of played back signal is greatly dependent on the period of the sequence of bits of the recorded signal and on the laser wavelength and the numerical aperture of the objective lens of the playback optical system.

In the present circumstances, the bit period f of the detection limit is determined by the laser wavelength λ of the playback optical system and the numerical aperture N.A. of the object lens thereof. That is, $f = \lambda/2 \cdot N.A.$ On the other hand, the track density is limited chiefly by the crosstalk. The crosstalk is still determined chiefly by the distribution (profile) of the laser beam on the medium and can be expressed substantially by the function of $\lambda/2 \cdot N.A.$ as the bit period.

Therefore, in order to realize the high-density recording on the conventional optical disc, it is fundamentally necessary to reduce the laser wavelength λ of the playback optical system and increase the numerical aperture N.A. of the object lens thereof.

However, there is a limit in the improvement of the laser wavelength and the numerical aperture of object lens. On the other hand, the technique for improving the recording density by devising the structure of the recording medium and the method of reading has been developed.

For example, this applicant proposed the system for improving the reproduction resolution by making reproduction while the recorded bits (magnetic domains) are being magnified or extinguished as disclosed in Japanese Patent Laid-open Gazettes Nos. 143041 and 143042/1989. In this system, a recording medium of an exchange-coupled multilayer film including a playback layer, an intermediate layer and a recording layer is used, and upon playback, the magnetic domains of the playback layer are magnified or extinguished by heating it with a playback light beam, so that the intercode interference upon reproduction can be reduced, thus enabling the reproduction of the signal of the period under the limit of light diffraction.

In the above system, however, the crosstalk is not improved as in the normal optical disc although the linear recording density is improved, and thus it is difficult to improve the track density.

In the above system, however, the resolution of recording is not considered although the resolution of playback is improved.

For example, in the light power modulation system in which the laser light is modulated in its intensity and forms bits, the bits of the size substantially equal to the laser beam diameter can be easily formed, but smaller bits for higher recording density are not formed satisfactorily by the fore end of the intensity distribution of the laser light because the recording power is difficult to control. In other words, in the optical power modulation recording, the laser light intensity has the Gaussian distribution, and considering the temperature diffusion of the magnetooptical recording medium, the tolerance of the laser power for forming small-diameter magnetic domains as compared with the beam diameter must be remarkably narrowed.

As used herein, the term "pits" refers to regions which store recorded data, for example, in the form of binary bits. When a pit is formed, data is stored within the recording medium.

Moreover, in the optical power modulation system, when the magnetic domain spacing (bit interval) is reduced for increasing the density, the temperature increase of the medium due to the laser light irradiated immediately before affects the recording power for the next magnetic domain. In other words, when random data are recorded, the optimum value of the recording power is changed by the pattern thereof.

Thus, the optical modulation system has a limit in the recording density, or the resolution of reproduction cannot be improved despite the endeavor to the improvement.

The known recording system for recording signals on the magnetooptical recording medium includes the light power modulation system and the magnetic field modulation system. Particularly, the magnetic field modulation system is regarded as being more advantageous in that the so-called over-write (overlapped writing) is possible.

When a signal is recorded by the magnetic field modulation system, however, the shape of the recorded magnetic domains normally tends to be like an arrow feather (or crescent shape) because the boundary line in the magnetizing direction is determined by the isothermal line when the recording magnetic layer cools. When the domains are formed in such a shape, the carrier is reduced and the jitter increases, resulting in the linear density being limited, as the signal period becomes short.

The perpendicular magnetic recording system which makes recording by the magnetic head is advantageous in the linear recording density and the over-write characteristic, and the shape of the recorded magnetic domains can be made substantially rectangular. In this case, the track density is limited by the restriction of the magnetic head.

A new recording system which is the combination of the magnetooptical recording system and the perpendicular magnetic recording system was reported by Otani and others in the 36th applied physics related joint lecture meeting (1a-2B-6). In this recording system, the magnetic head records the perpendicular magnetization film, and then immediately the signal in the vertical magnetization film is transferred to the magnetic recording layer by the light beam controlled in its tracking. Since this recording is substantially the magnetic recording, the over-write can be made and it is expected to have the track density and linear recording density based on the combination of the advantages of the magnetic recording and optical recording.

OBJECTS AND SUMMARY OF THE INVENTION

It is an object of the present invention to provide an improved magnetooptical playback method, in which linear recording density and track density are increased.

It is another object of the present invention to provide a recording method on a magnetooptical recording medium with increased linear recording density and track density.

According to one aspect of the present invention, there is provided a method for playback signal from a magnetooptical recording medium which comprises the steps of, a) preparing a magnetic recording medium having a recording hold magnetic layer and a playback magnetic layer magnetically coupled with each other, said recording hold magnetic layer having recording information in said layer as the direction of magnetization, b) applying an initializing external magnetic field to arrange magnetization of said playback magnetic layer in one direction without affecting to the magnetization in said recording hold magnetic layer, c) irradiating a laser light to said magnetooptical recording medium to locally heat the medium to cause transfer of the magnetization in said recording hold magnetic layer to said playback magnetic layer, to read out information by the interaction of said laser light and said transferred magnetization.

DESCRIPTION OF THE PREFERRED EMBODIMENTS

Figure 1:
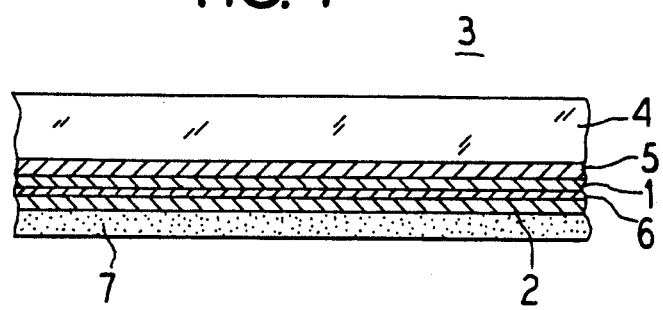
FIG. 1 is an enlarged schematical cross-sectional diagram of one embodiment of an magnetooptical recording medium used in the method of this invention.

According to this invention, as illustrated in FIG. 1 which is a enlarged schematical cross-sectional diagram, a magnetooptical recording medium 3 is prepared which is the lamination of a playback magnetic layer 1 and a recording hold magnetic layer 2 magnetostatically or exchange coupled thereto. Playback of signal from the magnetooptical recording medium 3 is explained as follows. As the magnetization direction in each of the magnetic layers 1 and 2 is indicated by the arrow in FIG. 2, the playback magnetic layer 1 is first magnetized in one direction, as shown by the region I, by applying an upward initializing external magnetic field Hi, and upon playback, the recorded information of the recording hold magnetic layer 2 is transferred to the playback magnetic layer 1 by the magnetostatic field from the recorded magnetization as indicated by the region II under the heated condition, or under the condition in which it is irradiated with light, for example, semiconductor laser light L. Then, the magnetized information transferred onto the playback magnetic layer 1 is read by the magnetooptical interaction, or Kerr effect.

In this case, when the recorded magnetization of the recording hold magnetic layer 2 is transferred onto the playback magnetic layer 1, a transfer auxiliary magnetic field Hr of a relatively weak intensity, or such an intensity as not to cause the transfer by itself, is applied to the portion where playback light L is irradiated in the opposite direction to the initializing external magnetic field Hi, thereby reinforcing the magnetostatic field for the transfer of the recorded magnetization of the recording hold magnetic layer 2 onto the playback magnetic layer 1, to assure the transfer.

According to this invention, since upon playback the playback magnetic layer 1 is once initialized to align its magnetization in one direction, the information magnetization recorded on the recording hold magnetic layer 2 at the specified area irradiated with the playback light L is transferred and read, the information can be read from the magnetization transferred from the specified area to be read under a proper selection of the temperature distribution on the magnetic recording medium 3 irradiated with the playback light, and the magnetic characteristic and temperature characteristic of each of the recording hold magnetic layer 2 and the playback magnetic layer 1 of the magnetic recording medium 3. At this time, no transferred magnetization can be formed on the adjacent tracks of the reproducing magnetic layer 1, and under this condition, the reproduction is made, so that the cross-talk between the tracks can be effectively avoided, thus leading to super-high density recording and improvement of S/N ratio.

First, one example of the magnetooptical recording medium 3 to be used in the method of this invention will be described with reference to FIG. 1. In this example, a transparent substrate 4 is prepared which has a high transparency to light of the wavelength for optical recording and playback, for example, semiconductor laser light. This substrate is, for example, in a magnetooptical disc, made of glass or a resin such as polycarbonate resin or acrylic resin. On the substrate, is formed a dielectric layer 5 which is, for example, made of SiN and functions to enhance Kerr rotation or as a protective film. Then, the reproducing magnetic layer 1, or a first perpendicular magnetization film is formed on the dielectric layer, and the recording hold magnetic layer 2, or a second perpendicular magnetization film is formed thereon through a nonmagnetic thin film 6 made of $SiO_2$ for magnetostatic coupling to the playback magnetic layer 1. In case, the playback magnetic layer 1 and the recording hold magnetic layer 2 are exchange coupled, no non-magnetic thin film 6 is provided. Also, a protective layer 7 made of an ultraviolet ray cured resin is deposited on the magnetic layer.

Figure 2:
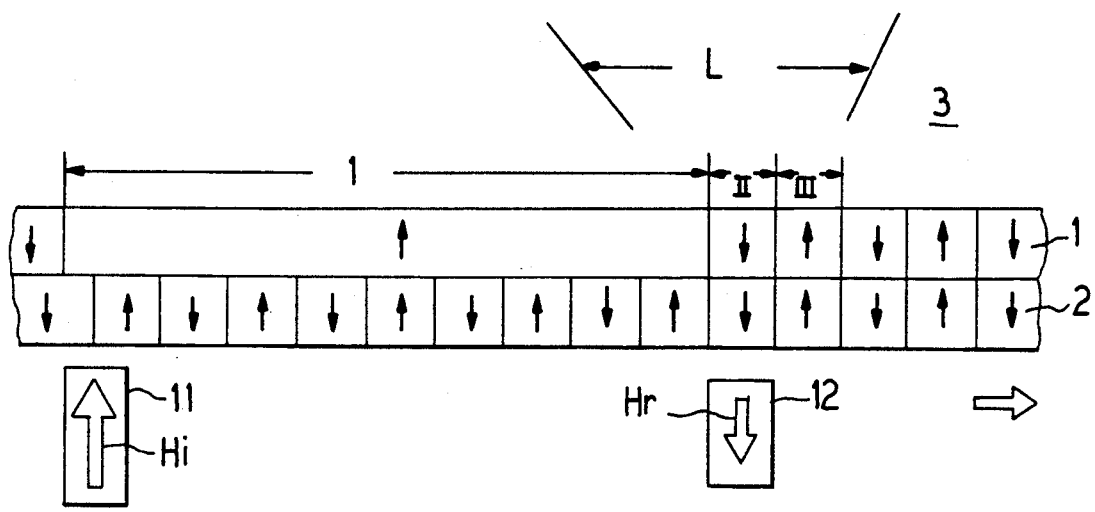
FIG. 2 is a diagram for explaining the playback operation.
Figure 3:
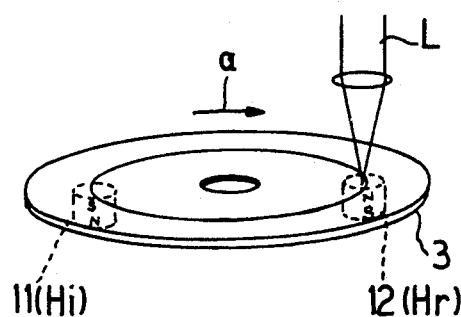
FIG. 3 is a diagram to which reference is made in explaining the method of recording and playback the magnetooptical recording medium.

On the magnetooptical recording medium 3 are provided magnetic field generating means 11 and 12, as shown in FIG. 2, for generating external magnetic fields Hi and Hr in the thickness direction of the medium 3 against the surface of the medium 3. To be concrete, the first field generating means 11 generates the initializing external magnetic field Hi and applies it to the magnetooptical recording medium 3 in the thickness direction of the medium 3 so that the field can be applied to the track area including a track being played-back and for example, both tracks adjacent to that track by the time when it is irradiated with light for playback. Thereafter, the second magnetic field generating means 12 generates the transfer auxiliary magnetic field Hr opposite to the initializing external field, and applies it to the area being irradiated with light for playback. In other words, when the magnetooptical recording medium 3 is a disk shape, the first magnetic field generating means 11 is disposed on the side preceding the area which includes the track being played-back and which is to be irradiated with playback laser light L, with respect to the rotation direction of the disc indicated by the arrow-a in FIG. 3. The initializing external magnetic field Hi is applied from the first magnetic field generating means 11 to the area which it faces, and the transfer auxiliary magnetic field Hr opposite to the field Hi is applied from the second magnetic field generating means 12 to the area being irradiated with playback light L. The recording of information on the optical magnetic recording medium 3 is made as usual. For example, the magnetization by the information being recorded, or magnetic domains based on the information are formed in the recording hold magnetic layer 2 by the usual method. In other words, under the condition that for example, a necessary external bias field is applied to that portion, semiconductor laser light is irradiated in accordance with the information being recorded, to that portion, so that the magnetized region is locally magnetically inverted to record the information. Alternatively, the magnetic field modulation recording method is used to make the recording.

Upon playback, the region to be read is passed by the first magnetic field generating means 11, so that initial magnetization is made in one thickness direction, for example, in the upward direction as indicated in FIG. 2 by the region I.

In this case, if the coercive force of the playback magnetic layer 1 is represented by Hc1, and the coercive force of the recording hold magnetic layer 2 by Hc2, the following condition at room temperature is given:

$$\text{ti } Hc1 < Hi < Hc2 \tag{1}$$

Also, when the temperature of the magnetic recording medium 3 is raised by the irradiation of the playback light L, the following condition at a predetermined temperature Tth is given:

$$Hr + Hs2 + Hd1 = Hc1 \tag{2}$$

When the temperature T satisfies the condition of T>Tth, and Hs2 is in the same direction as Hr, the following condition is satisfied:

$$Hr + Hs2 + Hd1 > Hc1 \tag{3a}$$

When Hs2 is in the direction opposite to Hr, the following condition is satisfied:

$$Hr + Hd1 < Hc1 + Hs2 \tag{3b}$$

where Hs2 is the stray magnetic field derived by the magnetization of the recording hold magnetic layer 2 which is applied to the playback magnetic layer 1, or the static magnetic field applied to the playback magnetic layer 1, and Hd1 is the demagnetizing field of the playback magnetic layer 1.

Figure 4:
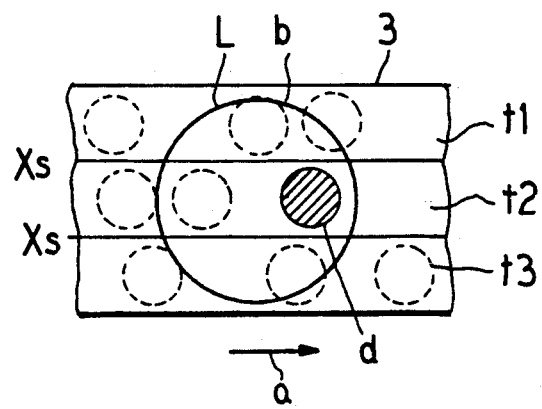
FIG. 4 shows the transfer magnetization at the time of playback.
Figure 8:
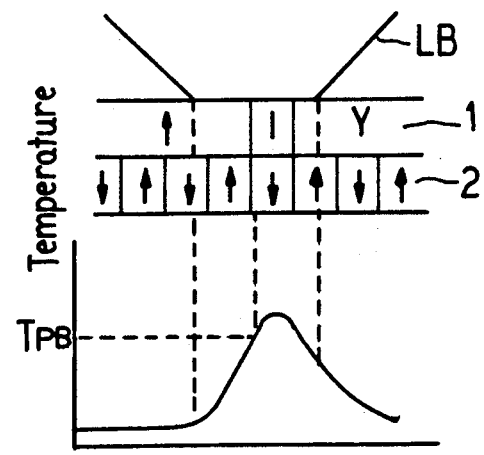
FIG. 8 is a diagram showing temperature distribution and the magnetization state of the magnetooptical recording medium.

FIG. 4 shows the magnetization states of the first, second and third adjacent tracks t1, t2, t3 of the magnetic recording medium 3. The circle indicated by reference character b shows the irradiated area irradiated with playback light L. We will now consider the playback of the central track t2. When the magnetic recording medium 3 is moved in the direction indicated by the arrow-a in FIG. 4, or from left to right in the figure, the first magnetic field generating means 11 applies the magnetic field Hi so that the playback magnetic layer 1 is magnetized for the initialization shown in FIG. 2 by region I on the basis of the condition (1). Thereafter, the playback light L advances to the irradiated area b. At this time, the magnetic recording medium 3 is locally increased in temperature by the irradiation of playback light L, or for example, semiconductor laser light. If the temperature is raised to Tth or above, the magnetization of the recording hold magnetic layer 2 is transferred to the playback magnetic layer 1 as indicated by regions II and III in FIG. 2 in accordance with the expression (3a) or (3b) depending on the direction of the recording magnetization in the recording hold magnetic layer 2, that is, in accordance with the expression (3a) when the recording magnetization of the recording hold magnetic layer 2 is in the same direction as the second external magnetic field Hr or in accordance with the expression (3b) when the recording magnetization of the recording hold magnetic layer 2 is in the direction opposite to the field Hr. In other words, as indicated by the shaded area in FIG. 4, the information magnetization of the recording hold magnetic layer 2 is transferred to a predetermined site on one side of the spot of the reproducing light L on the magnetic recording medium 3, as a transferred domain d. FIG. 8 shows the temperature profile and magnetization condition of the magnetooptical recording medium.

The information is read by the magnetooptical interaction in the playback magnetic layer 1, or by detecting the Kerr rotation angle of the irradiated light L.

Figure 5:
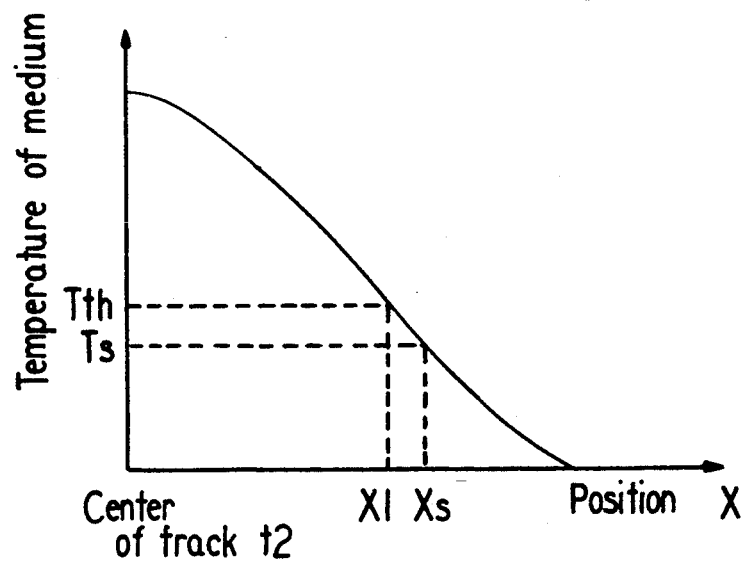
FIG. 5 shows a temperature distribution of the medium to which laser light is irradiated.

In this case, FIG. 5 shows the temperature distribution of the medium caused by the laser light irradiation. In FIG. 5, the abscissa is the distance x in the track width direction relative to the origin, or the center of the track t2 being played-back. If the boundary between the track t2 and a track adjacent to the track t2, for example, t1 or t3 is represented by Xs, the temperature Tth is fixed in the range from the center of the track to the boundary Xs of temperature Ts. Under this condition, the transferred domain d indicated by the shaded area in FIG. 4 is caused within the position Xs.

For the playback of the magnetic recording medium 3, only the information transferred to the playback magnetic layer 1, or the domain is read, and in this case, the playback magnetic layer 1 is selected to absorb much of the playback light L and to be thicker than a certain value so that the signal on the recording hold magnetic layer 2 is not played-back. When the playback magnetic layer 1 is, for example, a rare earth-transition metal amorphous magnetic film, and when the playback light is semiconductor laser of wavelength 780 nm, the thickness is selected to be 300 Å or above.

On the other hand, the field Hs2 from the recording hold magnetic layer 2 is desired to be large for satisfying the expressions (3a), (3b), but practically the Hs2, or the stray magnetic field from the recording hold magnetic layer 2 is limited. Thus, for satisfying the expression (3b), the coercive force Hc1 of the playback magnetic layer 1 is preferably small. In addition, to improve playback S/N ratio, the playback magnetic layer 1 is desired to be made of a material having a high Curie point and a large Kerr rotation angle. To this end, the playback magnetic layer 1 is desired to be made of, for example, a material of Gd Fe Co of which the Curie point Tc1 is 250° C. or above and of which the coercive force Hc1 is 500 (Oe) or below. In practice, however, when the relation of the coercive force Hc1 with the temperature T, of this kind of material is flat as for example shown in FIG. 7, the predetermined temperature Tth is difficult to control. Therefore, such a material as to have a relatively high Hc1 at around room temperature, and decrease the Hc1 suddenly at around Tth is desired, but in practice, such material is difficult to be found. Thus, the playback magnetic layer 1 is formed by exchange-coupling and laminating a first playback magnetic layer having the Curie point at around Tth and a relatively large coercive force at room temperature as for example shown in FIG. 6 by a broken line 61, and a second playback magnetic layer having a large Kerr rotation angle and a flat temperature-coercive characteristic curve, or which is made of, for example, Gd Fe Co, as indicated by a broken line 62, so that the total characteristic of the laminated playback magnetic layer 1 exhibits a high coercive force at room temperature and a low coercive force at around Tth as indicated by a solid curve 63 in FIG. 6. In this case, the second playback magnetic layer having a large Kerr rotation angle is formed on the side near the substrate 4 in FIG. 1.

Moreover, the recording hold magnetic layer 2 can be formed of a Tb Fe Co magnetic thin film magnetic layer having a large coercive force Hc2 for its magnetization not to be changed by the first external magnetic field Hi at room temperature, and a relatively high Curie point, for example, 200° C. for no deformation at around the temperature Tth. In this case, since the Hs2 is desired to be as large as possible upon playback, the Fe Co is predominant at room temperature, or the transition metal sublattice magnetization predominant film structure is desired to be effected.

EXAMPLE 1

This embodiment (FIG. 9) employs the magnetostatic coupling between the recording hold magnetic layer and the playback magnetic layer.

Figure 9:
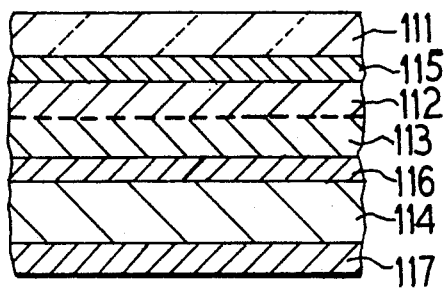
FIG. 9 is a schematical cross-sectional diagram of an example of the magnetooptical recording medium using magnetostatic coupling.

The magnetooptical recording medium of this embodiment is produced by laminating, on a transparent substrate 111 formed of polycarbonate resin, glass or the like a first playback magnetic layer 112, a second playback magnetic layer 113, and a recording hold magnetic layer 114 through dielectric films 115, 116, and forming a dielectric film 117 as the outermost layer as shown in FIG. 9. The dielectric film 115, 116, 117 may be made of a transparent dielectric material such as silicon nitride, silicon oxide or aluminum nitride.

The first playback magnetic layer 112 is a perpendicular magnetization film having a high value of Curie point (for example, 200° C. or above), a large Kerr rotation angle and a coercive force of several hundreds Oe or below.

The second playback magnetic layer 113 is a perpendicular magnetization film having a large perpendicular magnetic anisotropy, a low value of Curie point (for example, 200° C.) and a coercive force of about 2 kilo-oersted (kOe) at room temperature.

These first playback magnetic layer 112 and the second playback magnetic layer 113 are exchange-coupled.

Figure 6:
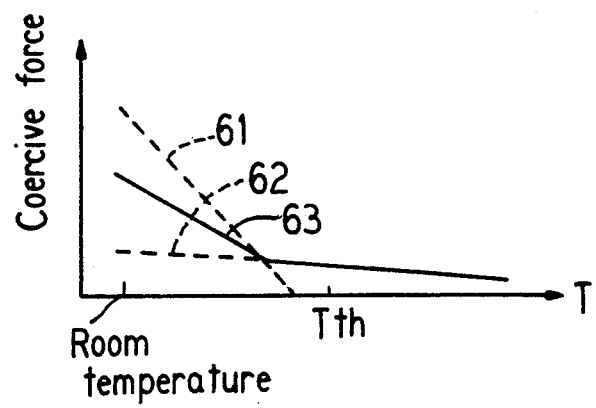
FIG. 6 shows a temperature characteristic of the coercive force of the playback magnetic layer.
Figure 7:
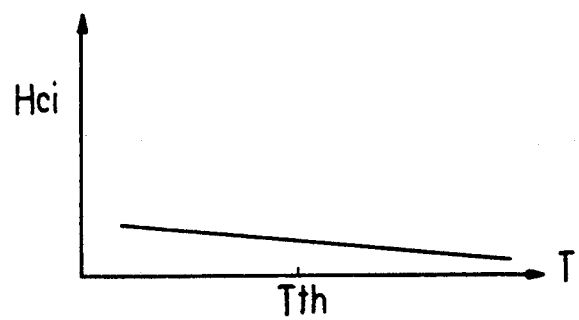
FIG. 7 shows a temperature characteristic of the coercive force of an example to be compared with the former characteristic.

The two-layer structure of the playback magnetic layer enables the temperature dependency of its magnetization inversion magnetic field to suddenly change at a certain temperature, and the inversion magnetic field to be reduced to as low as about 100 Oe at the Curie point of the second reproducing layer 113 or above, thus making it possible to stably transfer very small pits, as previously explained in connection with FIG. 6.

On the other hand, the recording hold magnetic layer 114 is made of a material having a large perpendicular magnetic anisotropy and a large value of Curie point higher than that of the second playback magnetic layer 113. The Curie point of the recording hold magnetic layer 114 becomes the standard for setting the margin between the recording and playback laser light outputs and is required to be 50° C. or above higher than the Curie point of the second playback magnetic layer 113.

In practice, the first playback magnetic layer 112 is made of GdFeCo, the second playback magnetic layer 113 is made of TbFe, and the recording hold magnetic layer 114 is made of TbFeCo, particularly the Curie point of the recording hold magnetic layer 114 being set to 280° C., the coercive force being set to 10 kOe or above.

When this magnetooptical recording medium was used, the the signal recorded on the recording hold layer 114 was transferred to the reproducing layer 112 by the reproducing light upon reproduction, a very high C/N ratio was obtained.

EXAMPLE 2

This embodiment employs the exchange coupling between the recording hold magnetic layer and the playback magnetic layer.

Figure 10:
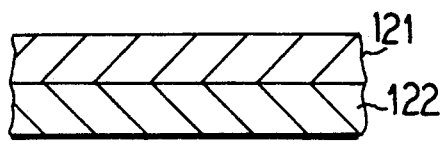
FIG. 10 is a schematical cross-sectional diagram of an example of the magnetooptical recording medium using exchange coupling.
Figure 11:
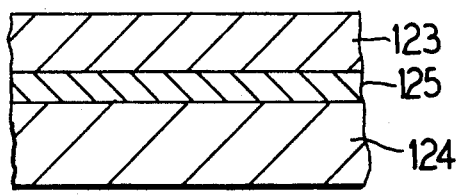
FIG. 11 is a schematical cross-sectional diagram of another example of the magnetooptical recording medium using exchange coupling, and, FIG. 12 is a schematical cross-sectional diagram of still another example of the magnetooptical recording medium using exchange coupling.
Figure 12:
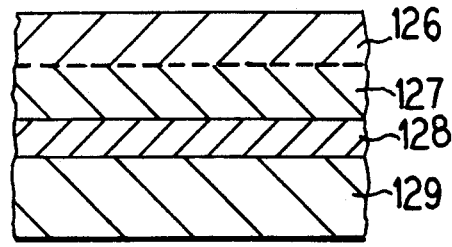

The magnetooptical recording medium employing the exchange coupling is constructed to have an exchange-coupled two-layer film structure (hereinafter, referred to a the medium A) which is formed of a playback magnetic layer 121 and a recording hold magnetic layer 122 as shown in FIG. 10. Moreover, the magnetooptical recording medium can be constructed to have an intermediate layer 125 between a playback magnetic layer 123 and a recording hold magnetic layer 124 (hereinafter, referred to as the medium B) as shown in FIG. 11, or to have a laminate of a two-layer structure comprising a first playback magnetic layer 126 and a second playback magnetic layer 127 similar to the first embodiment, an intermediate layer 128 and a recording hold magnetic layer 129 (hereinafter, referred to as the medium C) as shown in FIG. 12.

In the medium A, to satisfy the conditions for stable transfer of domain, the playback magnetic layer 121 and the recording hold magnetic layer 122 must be made thick, and there is a fear that the recording and erasing cannot be made at a high speed because of limited laser power.

Thus, it can be considered that the thickness of each layer is enabled to be thin by interposing intermediate layers to reduce the interfacial magnetic wall energy density. However, in the medium B, the temperature at which the equivalent field Hw1 due to the exchange force equals the magnetic domain generating field Hn1 of the playback layer is very sensitively dependent on the film constituents, film thickness and so on, with the result that the irregular surface of the periphery of the disc tends to remarkably affect the playback operation, thus increasing noise and jitter.

On the contrary, in the medium C, the first playback magnetic layer 126 is made of a material having a large value of Curie point, a large Kerr rotation angle, and a small coercive force, and the second playback magnetic layer 127 is made of a material having a small value of Curie point and a coercive force of (about 2 kOe, so that the S/N ratio upon playback can be increased.

The inventors produced sample discs by laminating on a polycarbonate resin substrate, a dielectric layer (800 Å thick) of $Si_3N_4$, a first playback magnetic layer (300 Å thick) of GdFeCo, a second playback magnetic layer (150 Å thick) of TbFe, an intermediate layer (100 Å thick) of GdFeCo, a recording hold magnetic layer (350 Å thick) of TbFeCo and a dielectric layer (800 Å thick) of $Si_3N_4$ in turn by sputtering.

Then, a carrier signal of 5 MHz was written in the recording hold magnetic layer and played-back at a linear speed of 5 m/sec, and at a playback external magnetic field Hr of 500 Oe, and the laser output dependency of the carrier and noise upon playback was examined. Also, the crosstalk was measured. The measurement of the crosstalk was made on the disc in which grooves of 0.8 μm wide were formed with a spacing of 0.8 μm (thus, lands of 0.8 μm wide were formed between the grooves) in the substrate and a signal of 4.8 MHz was recorded on both lands and grooves.

Figure 13:
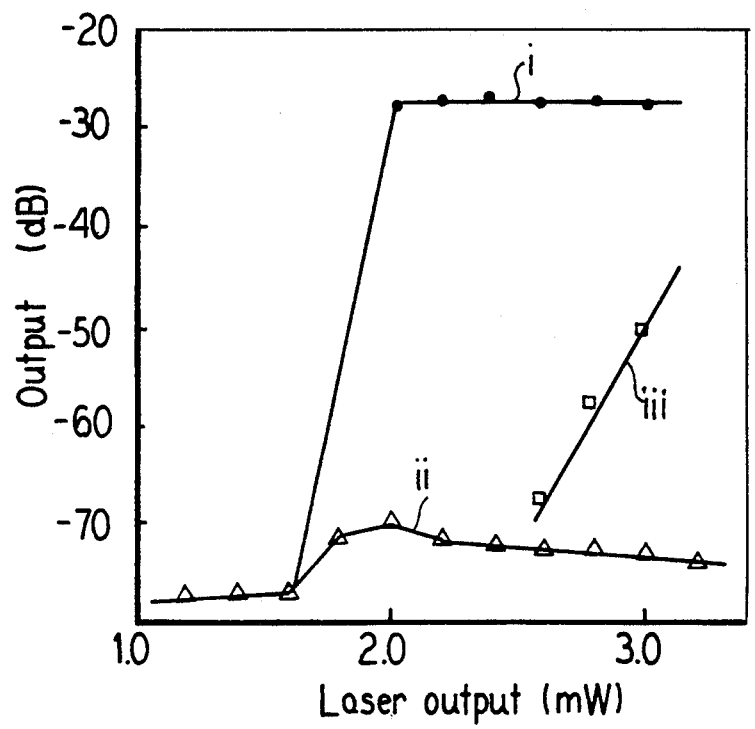
FIG. 13 is a graph showing the laser output dependency of the carrier output and crosstalk when the magnetic domains are reproduced while being transferred to the playback magnetic layer.

The result of the measurement is shown in FIG. 13. In FIG. 13, line i indicates the playback output of the carrier, line ii the playback output of noise, and line iii the crosstalk.

Why no carrier is observed at a laser output of 1.6 mW or below is that at this power the medium temperature does not reach the temperature necessary to cause the transfer of the signal from the recording hold magnetic layer to the playback magnetic layer.

On the contrary, at a laser output of 2.0 mW or above, the carrier is suddenly observed. The crosstalk is almost not detected at a laser output of 2.0 mW or below. Therefore, this sample disc, under the laser output of 2.0 mW to 2.5 mW, can playback the recorded signal at a high C/N ratio without any crosstalk.

Thus, in order to confirm the excellency in the playback according to the present invention, we examined the bit period dependency of C/N. The measurement was performed at a linear speed of 5 m/sec, a playback magnetic field of 500 Oe, a laser wavelength of 780 nm and a numerical aperture N.A. of object lens, 0.53. The result of the measurement is shown in FIG. 14.

Figure 14:
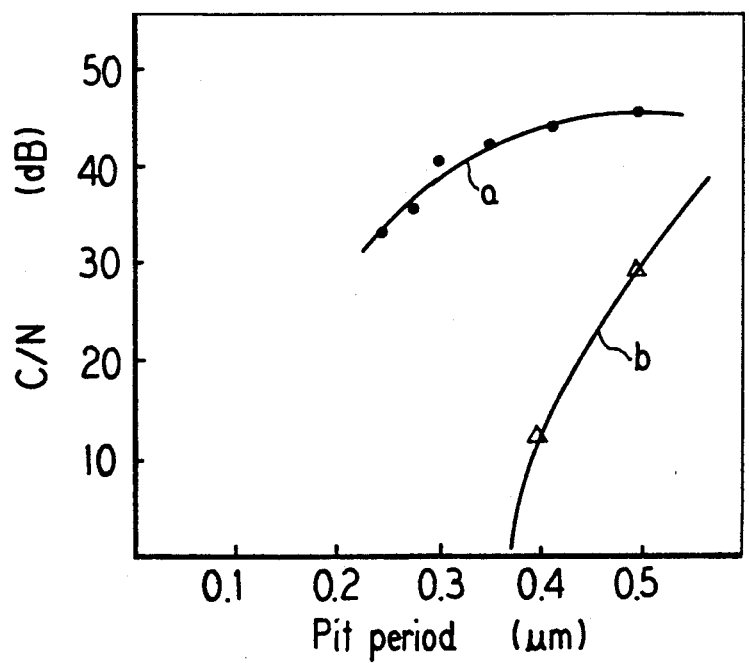
FIG. 14 is a graph showing the bit period dependency of the C/N when the magnetic domains are played back while being transferred, together with that upon normal playback for comparison with the former.

In FIG. 14, a curve a shows the characteristic obtained under the condition that the playback magnetic layer was initialized by the external magnetic field of 3.5 kOe and that the playback was made at a laser output of 2.8 mW while the magnetic domains were transferred, and a curve b shows the characteristic obtained under the condition that after the playback was once made under the same conditions, the playback was made at a laser output 1.4 mW without initializing. Thus, the curve b corresponds to the C/N obtained upon normal reproduction.

From FIG. 14, it will be understood that the C/N can be greatly improved by the method of this invention.

Next, high density recording method will be explained, which corresponds to and utilizes the advantage of the playback method explained hereinbefore.

According to this invention, a recording medium is employed having an magnetooptical recording layer and a perpendicular magnetization magnetic recording layer laminated on a substrate, the magnetooptical recording layer including at least a transfer magnetic layer onto which a recorded signal of the perpendicular magnetization magnetic recording layer is transferred, and a playback magnetic layer which is magnetically coupled to the transfer magnetic layer at room temperature and converts the recorded signal into an optical signal by the magnetooptical effect, the coercive force Hc1 and Curie point Tc1 of the perpendicular magnetization magnetic recording layer and the coercive force Hc2 and Curie point Tc2 of the transfer magnetic layer having such relations as Tc2<Tc1, Hc1<Hc2, the playback magnetic layer being magnetically decoupled from the transfer magnetic layer by the temperature rise due to laser irradiation upon playback so that the recorded magnetic domains are deformed.

According to the magnetooptical recording medium used in this invention, the recording of a signal is made on the perpendicular magnetization magnetic recording layer by a magnetic head. At this time, since the coercive force Hc1 of the magnetic recording layer is smaller than the coercive force Hc2 of the transfer magnetic layer, the transfer magnetic layer is not influenced by the magnetic field upon recording on the magnetic recording layer.

The signal recorded in the magnetic recording layer is transferred to the transfer magnetic layer by irradiating laser light onto the transfer magnetic layer provided in contact with the perpendicular magnetization magnetic recording layer to raise the temperature, or by using the exchange coupling or magnetostatic coupling between the perpendicular magnetization magnetic recording layer and the transfer magnetic layer. The linear recording density of the magnetic domain pattern be transferred is determined by that upon recording the magnetic head, while the track width is determined by the spot diameter of the laser light to be irradiated. In the playback magnetic layer magnetically coupled with the transfer magnetic layer, too, the magnetization direction is changed and a magnetic domain pattern corresponding to that on the transfer magnetic layer is formed.

Upon playback, when laser light is irradiated on the playback magnetic layer, the magnetized signal recorded on the playback magnetic layer is converted into an optical signal and read by the magnetooptical effect (magnetic Kerr effect, Farady effect).

At this time, the playback magnetic layer and the transfer magnetic layer are magnetically and partially decoupled from each other by the temperature distribution within the laser beam diameter, and for example, an external magnetic field is applied to deform the magnetic domains of the magnetically decoupled portion (magnified, reduced or inverted depending on the direction of the external magnetic field). As a result, the magnetic domain pattern within the laser beam diameter is read in a partially masked form, so that even the signal formed at a pitch smaller than the laser beam diameter can be reproduced at a high S/N ratio.

An embodiment of this invention will be described with reference to the drawings.

Figure 15:
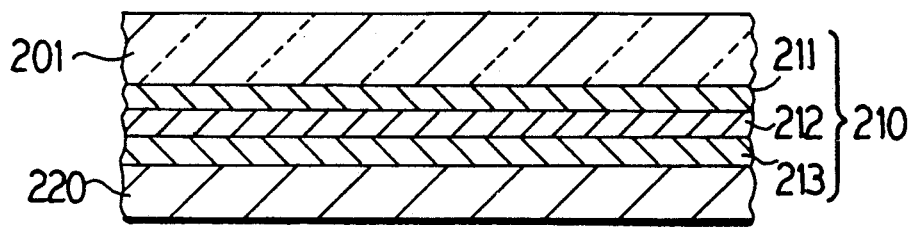
FIG. 15 is an enlarged schematical cross-sectional diagram of a main part of the magnetooptical recording medium of the invention.

The magnetooptical recording medium of this embodiment is formed of an magnetooptical recording layer 210 having a playback magnetic layer 211, an intermediate layer 212 and a transfer magnetic layer 213, and a perpendicular magnetization magnetic recording layer 220 laminated on a transparent substrate 201, as shown in FIG. 15.

The perpendicular magnetization magnetic recording layer 220 may be made of any material if it has the perpendicular magnetic anisotropy, or preferably an alloy thin film of CoCr, PtCo, PdCo, TbFeCo, or TbFe. The thickness of the magnetic recording layer 20 may be 100 Å or above, and normally it is selected in the range from about 100 Å to 300 Å.

On the other hand, the playback magnetic layer 211, intermediate layer 212 and transfer magnetic layer 213 constituting the magnetooptical recording layer 210 are also the perpendicular magnetization films. Particularly, since the playback magnetic layer 211 is required to convert the signal in the form of direction of magnetization into an optical signal by the magnetooptical effect, a magnetic film with a large Kerr rogation angle or a large Farady rotation angle is used, and in this case, normally, a rare earth element-transition metal alloy film is used. The playback magnetic layer 211, the intermediate layer 212 and the transfer magnetic layer 213 are preferably magnetically coupled at room temperature by exchange coupling, and thus, the intermediate layer 212 and the transfer magnetic layer 213 are formed of the same rare earth element-transition metal alloy film as the playback magnetic layer 211. The rare earth element-transition metal alloy film to be used for the playback magnetic layer 211, intermediate layer 212 and transfer magnetic layer 213 may be, for example, TbFeCo, TbFe, GdFeCo, or the like and it is selected to meet the conditions which will be mentioned later.

Of the magnetooptical recording layer 210 of the above structure, the thickness of the playback magnetic later 211 is preferably 250 Å or above considering the S/N ratio upon playback. The thickness of the intermediate layer 212 is preferably 50 Å or above from the standpoint of certainly cutting off the magnetic coupling between the playback magnetic layer 211 and the transfer magnetic layer 213 upon heating. The thickness of the transfer magnetic layer 213 is preferably 100 Å or above or more preferably in the range from 200 to 500 Å because the equivalent magnetic field or stray field due to the exchange coupling between it and the perpendicular magnetization magnetic recording layer 220 is required to be smaller than the coercive force of the transfer magnetic layer 213.

The magnetic recording layer 220 and the transfer magnetic layer 213 are required to be exchange-coupled or magnetostatically coupled, and the conditions, Tc2<Tc1, Hc1<Hc2 are satisfied where Hc1 is the coercive force of the perpendicular magnetization magnetic recording layer, Tc1 is the Curie point thereof, Hc2 is the coercive force of the transfer magnetic layer, and Tc2 is the Curie point thereof.

The Curie points and the coercive forces of the playback magnetic layer 211, intermediate layer 212 and transfer magnetic layer 213 of the magnetooptical recording layer 210, Tca, Tcb, Tcc (=Tc2), Hca, Hcb, Hcc (=Hc2), are selected to satisfy the conditions, Tcb >Trt (=room temperature), and Tcb<Tca, Tcc. In addition, the coercive force Hca of the playback magnetic layer 211 is small enough at near the Curie point Tcb of the intermediate layer 212, and the coercive force Hcc of the transfer magnetic layer 213 is much larger than a predetermined magnetic field (magnetic field applied upon playback) necessary in the temperature range from the room temperature Trt to a predetermined temperature Tpb (the temperature to be raised to upon playback) higher than the Curie point Tcb of the intermediate layer 212.

A dielectric layer may be formed between the magnetooptical recording layer 210 and the transparent substrate 201, and a protective film or the like may be formed on the surface of the magnetic recording layer 220, if necessary, although the illustration will be omitted.

The principle of the recording and playback of the magnetooptical recording medium of the above structure will be mentioned below.

First, upon recording, only the perpendicular magnetization magnetic recording layer 220 is recorded by a magnetic head M as in the normal perpendicular magnetic recording system. At this time, the transfer magnetic layer 213 provided in contact with the magnetic recording layer 220 is prevented from being affected by the recording operation. For example, the coercive force Hc2 of the transfer magnetic layer 213 at room temperature is made much greater than the magnetic field Hm produced from the magnetic head M, or Hc2>>Hm.

Then, the signal (magnetic domain pattern) magnetically recorded on the magnetic recording layer 220 is transferred to the transfer magnetic layer 213 by irradiating the focused laser beam to the transfer magnetic layer 213.

Figure 16:
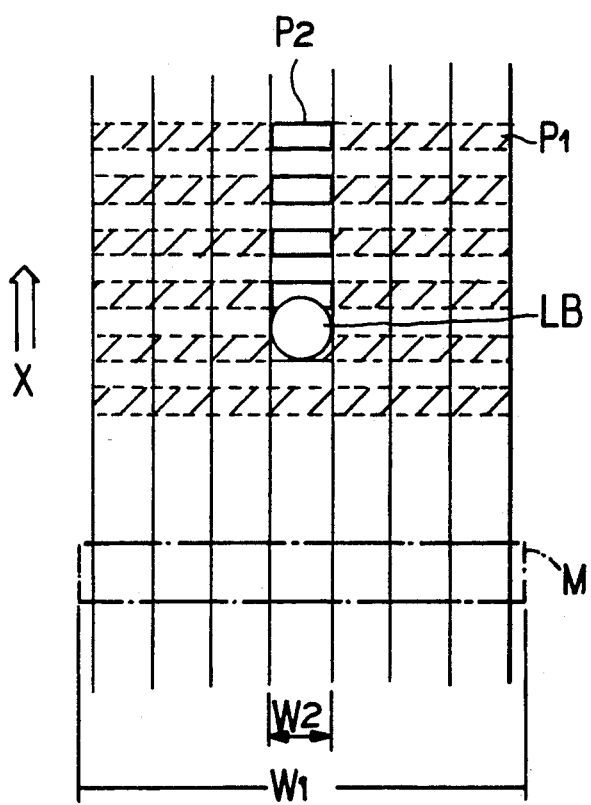
FIG. 16 is a schematical plan view of the magnetic domain pattern written in the perpendicular magnetic recording layer and the transfer layer.
Figure 17:
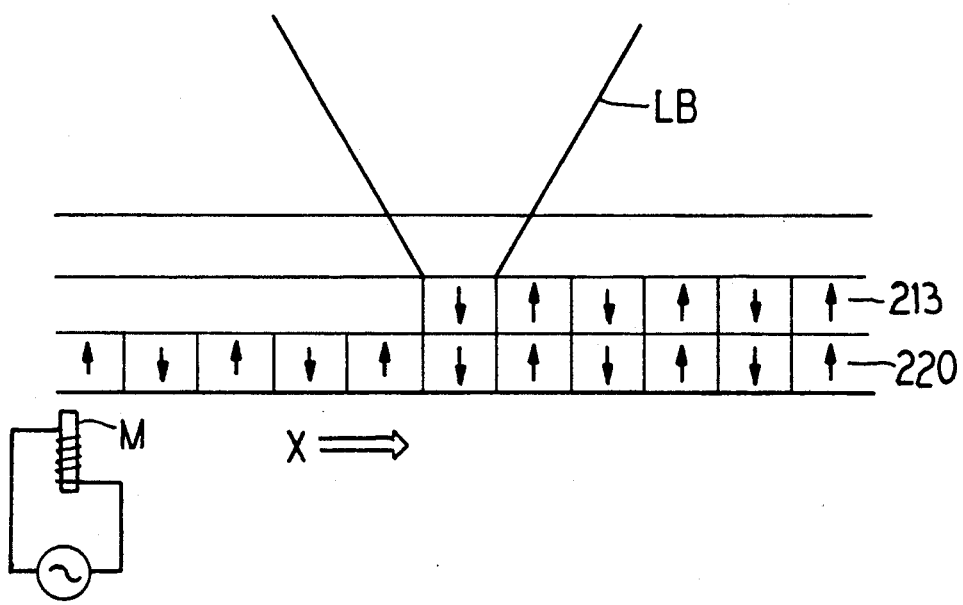
FIG. 17 is a schematical diagram showing the magnetized state at this time.

FIGS. 16 and 17 schematically show the above operations. In FIG. 17, only the magnetic recording layer 220 and the transfer magnetic layer 213 are shown, but the intermediate layer 212 and the playback magnetic layer 211 are not shown. In FIG. 17, the arrows in the magnetic recording layer 220 and the transfer magnetic layer 213 indicate the direction of the magnetization or the atomic magnetic moment.

When the magnetooptical recording medium is transported in the arrow-X direction, a magnetic domain pattern P1 as indicated by the shaded areas in FIG. 16, is formed on the magnetic recording layer 220 by the preceding magnetic head M. This magnetic domain pattern P1 has a wide track width W1 corresponding to the magnetic gap width of the magnetic head M, a high linear recording density and a rectangular shape.

When the focused laser beam LB is irradiated onto the transfer magnetic layer 213, the temperature of the transfer magnetic layer 213 is raised, suddenly reducing the coercive force, so that the magnetization finally disappears. Then, because the transfer magnetic layer 213 is magnetostatically coupled or exchange-coupled with the magnetic recording layer 220, the signal magnetically recorded in the magnetic recording layer 220 is transferred in the cooling process.

If, for example, the transfer magnetic layer 213 and the magnetic recording layer 220 are magnetostatically coupled, the magnetization of the magnetic recording layer 220 produces a stray magnetic field. Under this condition, when the laser beam is irradiated onto the transfer magnetic layer 213, heating it to near the Curie point Tc2 of the transfer magnetic layer 213, the magnetization direction of the transfer magnetic layer 213 is changed to the stray magnetic field direction in the cooling process, thus the signal being transferred. At this time, since the Curie point Tc1 of the magnetic recording layer 220 satisfies the condition Tc2<Tc1, the magnetic recording layer 220 is not demagnetized unless the temperature rise by the irradiation of the laser beam exceeds the Curie point Tc1.

Similarly, when the magnetic recording layer 220 and the transfer magnetic layer 213 are exchange-coupled, the signal on the magnetic recording layer 220 is transferred to the transfer magnetic layer 213 for the following reason. The two laminated layers originated from the same or similar ferromagnetism are exerted thereon with a magnetic force when the atomic magnetic moments (different from the magnetization) of the layers are equally in a particular direction. If the atomic magnetic moment of the perpendicular magnetic recording layer 220 is oriented upward as shown in FIG. 17, the atomic magnetic moment of the transfer magnetic layer 213 right thereover is also oriented upward. This force (exchange force) acts equivalently to the magnetic field. Similarly as in the magnetostatically coupled case, when the laser beam is irradiated onto the transfer magnetic layer 213, heating it to near the Curie point Tc2 of the transfer magnetic layer 213, the atomic magnetic moment of the transfer layer 213 is oriented in the direction of the atomic magnetic moment of the perpendicular magnetic recording layer 220 in the cooling process, thus the signal being transferred.

Even in either one of the magnetostatic coupling and the exchange coupling, the transfer of signal is made only in the range of the diameter of the laser beam, and thus, a magnetic domain pattern P2 as indicated by the black areas in FIG. 16 is formed in the transfer magnetic layer 213. This magnetic domain pattern is formed not only in the transfer magnetic layer 213 but also in the intermediate layer 212 and the playback magnetic layer 211 which are magnetically coupled (exchange-coupled) therewith, at the same time.

The track width W2 of this magnetic domain pattern P2 is determined by the diameter of the laser beam LB, and the shape of the magnetic domain pattern is finely rectangular. This is constrasted with the arrow feather shaped magnetic domain pattern recorded by the conventional magnetic field modulation system.

Thus, as to the recording density on the magnetooptical recording medium of this embodiment, the linear recording density upon writing is determined by the magnetic head, and the track density by the temperature profile at the time of irradiation of the focused light beam. From the standpoint of playback, the linear recording density is determined substantially by the wavelength of the laser beam and the numerical aperture of lens, and the track density by the crosstalk. If the linear recording density at which writing can be made by the magnetic head is compared with that at which playback can be made by the laser beam, in the actual circumstances the latter playback performance is poor and thus to substantially improve the recording density it is necessary to improve this.

Thus, upon playback, the magnetic domain pattern recorded in the playback magnetic layer 211 is deformed to reduce the apparent space frequency of the recorded pits, thus improving the recording density. The basic principle for the reproduction will be mentioned below, which is similar to the method described previously.

Figure 18:
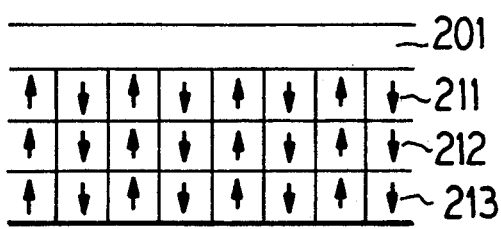
FIG. 18 is a schematical diagram showing the initially magnetized state of the magnetooptical recording layer.
Figure 19:
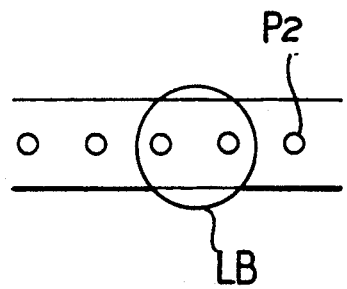
FIG. 19 is a schematical diagram of the magnetic domain pattern of the playback magnetic layer at this time.

It will be now assumed that as shown in FIGS. 18 and 19 a certain magnetic signal is transferred to the playback magnetic layer 211, intermediate layer 212 and transfer magnetic layer 213 to form a magnetic domain pattern thereon. In FIG. 18, the perpendicular magnetic recording layer 220 is not shown, and in FIG. 19, the magnetized regions in the upward direction are indicated by black.

When the signal is tried to read by the laser beam LB of which the diameter is larger than the pitch of the recorded pits (magnetic domain pattern), the beam spot includes a plurality of recorded bits, and therefore cannot read separately on the magnetooptical recording medium in the prior art.

According to the magnetooptical recording medium of this embodiment, however, since the magnetic recording medium 210 is formed of a multilayer having the playback magnetic layer 211, intermediate layer 212 and transfer layer 213, the magnetic domain pattern of the playback magnetic layer 211 can be deformed, and thus the respective recorded pits can be read at a high S/N ratio even if the beam diameter is larger than the pitch of the recorded bits.

Figure 20:
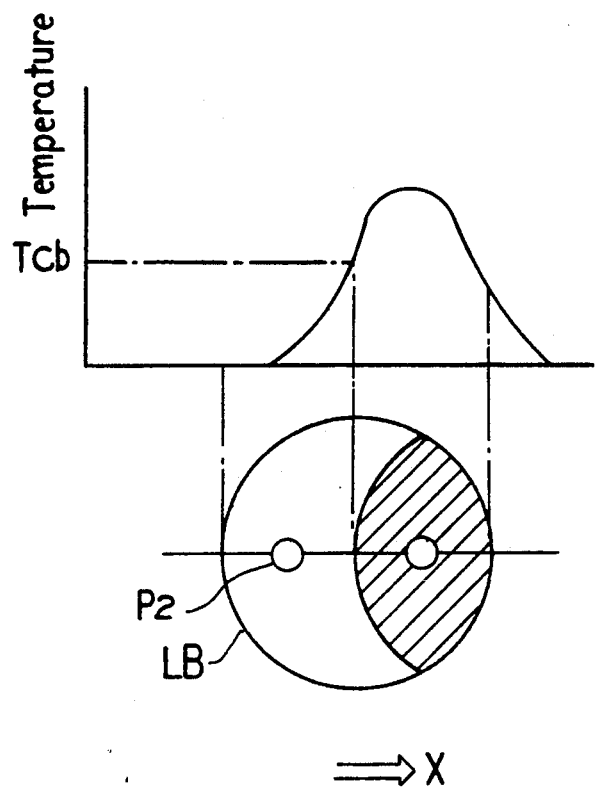
FIG. 20 is a characteristic diagram showing the temperature profile of the laser spot upon reproduction.

First, when the laser beam LB is irradiated on the magnetooptical recording layer 210 formed of the multilayer, a temperature distribution occurs within the beam diameter so that as shown in FIG. 20, the front side area (shaded area) of the laser beam spot relative to the medium transport direction becomes higher in temperature.

At this time, if the temperature Tpb of the shaded area is above the Curie point of the intermediate layer 212, the intermediate layer is demagnetized so that the magnetic coupling (exchange coupling) between the playback magnetic layer 211 and the transfer magnetic layer 213 is broken.

Figure 21:
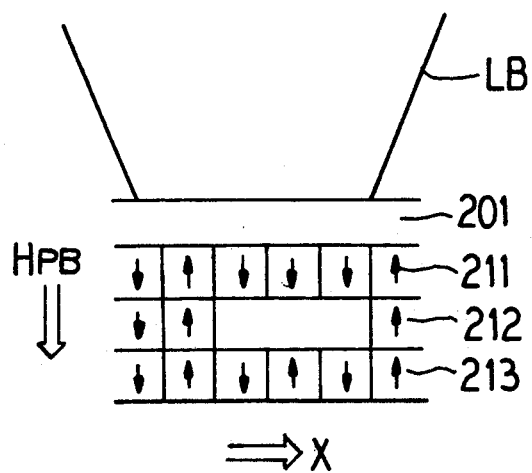
FIG. 21 is a schematical diagram showing the magnetized state of the magnetooptical recording layer at this time.

Under this condition, when the external magnetic field Hpb stronger than the coercive force Hca of the playback magnetic layer 211 is applied, the magnetization of the playback magnetic layer 211 at the shaded region is inverted into the same direction as the external magnetic field Hpb (here the downward direction) as shown in FIG. 21. On the other hand, in the area other than the shaded region, or the low-temperature region, the playback magnetic layer 211 and the transfer magnetic layer 213 are still magnetically coupled, and thus the magnetic domain pattern transferred onto the transfer layer 213 remains as it is.

Figure 22:
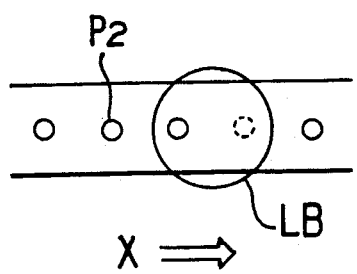
FIG. 22 is a schematical diagram of the magnetic domain pattern of the playback recording layer.

Therefore, as shown in FIG. 22, the shaded region of the beam spot is brought to such a condition as if it were masked, or such a condition that the magnetic domain pattern recorded in this region is apparently erased and as if a single magnetic domain pattern were present within the beam spot. In other words, the spatial frequency of the recorded pits as viewed from the playback light upon playback seems to be lower than the actual value, and the absolute value MTF (modulation transfer function) of the optical transfer function (OTF) increases, resulting in the improvement of the playback resolution. In this method, upon playback the condition of MTF$>$0 can be satisfied for the pit sequence of the spatial frequency, $\nu > 2$ N.A./$\lambda$ (where N.A. is the numerical aperture of the object lens, and $\lambda$ is the wavelength of the laser beam) and thus the signal detection is possible.

If the coercive force Hcc of the transfer layer 213 is selected to be larger than the intensity of the external magnetic field Hpb, the magnetization (magnetic domain pattern) of the transfer layer 213 is never changed by the application of the external magnetic field Hpb.

Moreover, when upon cooling, the exchange force is again exerted at the temperature T=Tcb, to satisfy the following conditions, the magnetization pattern on the transfer layer 213 is transferred to the intermediate layer 212 and the playback magnetic layer 211, thus the same condition as before playback being brought about.

That is, when $T \leq Tcb - \Delta T$,

2 Msa Hca ha + 2 Msa Hpb ha $< \sigma w$

2 Msc Hcc hc + 2 Msc Hpb hc $< \sigma w$ where the film thickness of the intermediate layer 212 can be neglected as compared with the width of the interfacial magnetic wall caused between the transfer layer 213 and the playback magnetic layer 211, Msa is the saturated magnetization of the playback magnetic layer 211, ha is the film thickness of the playback magnetic layer 211, Msc is the saturated magnetization of the transfer layer 213, hc is the film thickness of the transfer layer 213, and $\sigma w$ is the interfacial magnetic wall energy (erg/cm$^2$).

The above expressions are examples of conditions for the case in which the same sublattice magnetization is predominant even if the playback magnetic layer 211 and the transfer layer 213 are of a ferromagnetic material or ferrimagnetic material.

So far, description has been made of the reading method for playback while the recording magnetic domain of the playback magnetic layer 211 is being inverted by the external magnetic field in an example in which the same sublattice magnetization is predominant even if the playback magnetic layer 211 and the transfer layer 213 are of a ferromagnetic material or a ferrimagnetic material. If the playback magnetic layer 211, the intermediate layer 212 and the transfer layer 213 constituting the magnetooptical recording layer 210 are of a rare earth element-transition metal magnetic film, and if the sublattice magnetization of the transition metal and that of the rare earth element have opposite direction, the direction of the external magnetic field Hpb to be applied upon playback is selected depending of whether each layer is the predominant film for the transition metal sublattice magnetization, or for rare earth element sublattice magnetization, thereby enabling the magnetic domain pattern to invert, reduce or magnify, so that the apparent spatial frequency can be suppressed and that the playback resolution can be improved, as in the above embodiment.

The result of the evaluation of the recording and reproducing characteristics of the actually produced sample disc will be given below.

EXAMPLE 3

On a glass base having track grooves of 1.6 μm in track pitch, is formed a dielectric film of silicon nitride, and on this film is further formed a lamination of a playback magnetic layer of GdFeCo, an intermediate layer of TbFe and a transfer magnetic layer of TbFeCo. On this laminated layer, is formed a perpendicular magnetic recording layer of TbFeCo. Each layer was formed by sequencial sputtering of a high-frequency magnetron sputtering apparatus.

The thickness, Curie point and magnetic characteristics (coercive force) of each layer are listed on Table 1.

TABLE 1

|  | Material | Thickness (Å) | Curie point (°C.) | Coercive force (Oe) |
|---|---|---|---|---|
| Playback magnetic | GdFeCo | 250 | >400 | 150 |

TABLE 1-continued

|  | Material | Thickness (Å) | Curie point (°C.) | Coercive force (Oe) |
|---|---|---|---|---|
| layer Intermediate layer | TbFe | 50 | 130 | 10000 |
| Transfer layer | TbFeCo | 600 | 250 | 18000 |
| Perpendicular magnetic recording layer | TbFeCO | 500 | >300 | 700 |

EXAMPLE FOR COMPARISON

A magnetooptical recording layer and a perpendicular magnetic recording layer of a single layer each are laminated on a glass plate similar to that in the above Example 3. The film thickness, Curie point and magnetic characteristic (coercive force) of each layer are listed on Table 2.

TABLE 2

|  | Material | Film thickness (Å) | Curie point (°C.) | Coercive force (Oe) |
|---|---|---|---|---|
| Magneto-optical layer | TbFeCO | 600 | 250 | 18000 |
| Perpendicular magnetic recording layer | TbFeCo | 500 | >300 | 700 |

Figure 23:
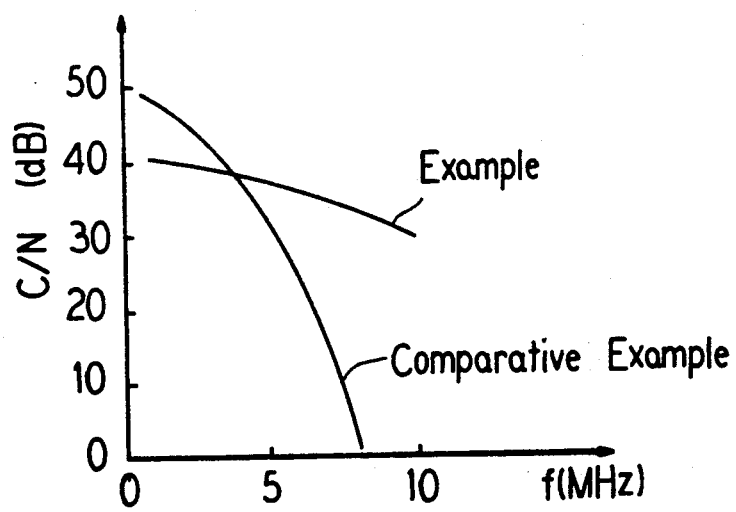
FIG. 23 is a characteristic diagram showing the recording frequency dependency of S/N ratio in the actually produced magnetooptical recording medium together with that in the example for comparison.

A signal is recorded on the samples of the Example 3 and the example for comparison by a magnetic head, transferred by an optical pickup, and reproduced, and the recording frequency dependency of the signal-to-noise ratio (N/S) is examined for these samples. The result is shown in FIG. 23.

In this experiment, the numerical aperture, N.A. of the object lens of the pickup used upon playback is 0.50, the laser wavelength is 780 nm, the linear speed is 7.5 m/sec, and the external magnetic field of 400 Oe is applied upon playback.

As a result, a great difference is found particularly in the high frequency region between the embodiment and the example for comparison.

Another method for recording and playback will be explained with reference to FIGS. 24 and 25, in which magnetooptical recording medium having a transparent substrate 301, playback magnetic layer 302 an intermediate layer 303, and recording hold magnetic layer 304, similar to shown in FIG. 15 without perpendicular magnetization magnetic recording layer 220.

Figure 24:
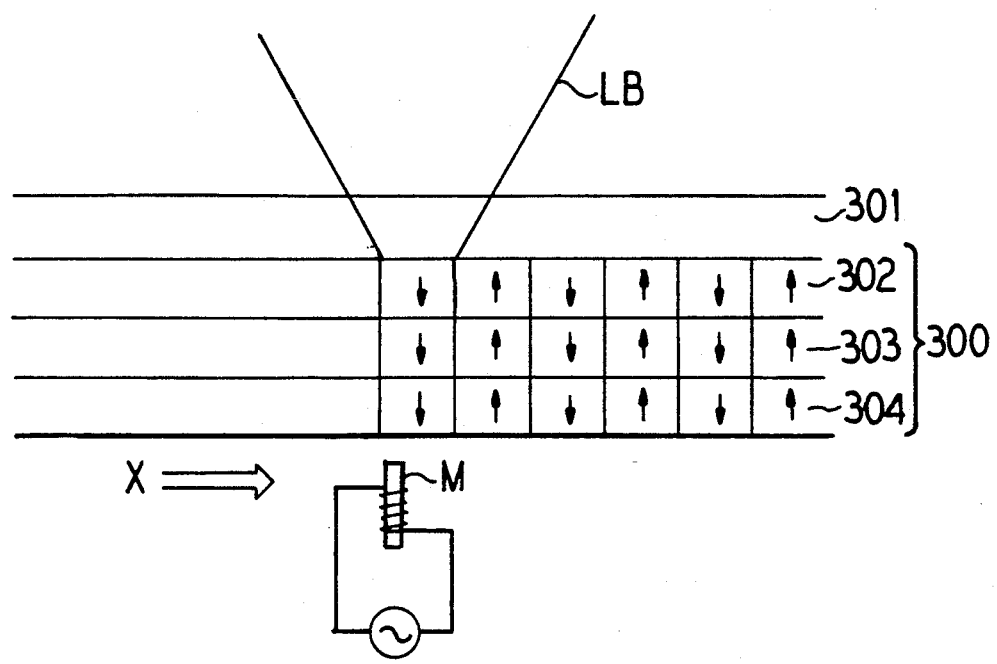
FIG. 24 is a cross-sectional diagram for explaining the method of recording on the magnetooptical recording medium wherein the playback is made while the recorded magnetic domains of the playback layer are being deformed.

As shown in FIG. 24, signal is recorded on the magnetooptical recording medium 300 by applying magnetic field by a magnet M which generates a signal magnetic field modulated according to the signal to be recorded, at a portion of the recording medium where a laser light beam LB is irradiated.

In the magnetic field modulation recording, the recording layer is irradiated with laser light so that it is heated to the Curie point or a compensation point temperature or above, and under this state, the external magnetic field is applied with its polarity inverted in accordance with the recorded signal. In the magnetic field modulation recording, the bit length is controlled by the external magnetic field and is never affected by the intensity distribution of the laser light.

Figure 25:
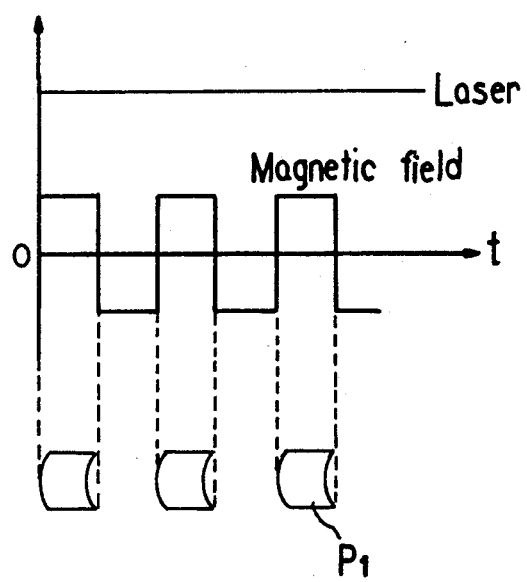
FIG. 25 is a schematic diagram showing the inversion timing of the external magnetic field, and the magnetic domain pattern formed thereby.

FIG. 25 is a diagram schematically showing the shape of the recorded magnetic domains which are formed when the polarity of the external magnetic field is inverted with the laser output kept constant. The recorded magnetic domain P1 becomes like a circular arc because of the temperature rise profile by the laser light, and the boundary in the direction in which the medium is moved coincides with the timing of the inversion of the external magnetic field. The linear density of the recorded magnetic domains (recording density along the recorded track) is determined by the inversion frequency of the external magnetic field.

Therefore, the magnetooptical recording medium having at least a playback magnetic layer and a recording layer is recorded by the magnetic field modulation recording and upon playback the magnetized state of the playback magnetic layer is changed while the pits are deformed or transferred. This feature can improve the recording density and make the playback resolution maintained high, thus enabling high density recording.

Principle of the playback from the magnetooptical recording medium is the same as explained hereinbefore.

EXAMPLE 4

We evaluated the recording and reproduction characteristics of the actually produced sample discs. The result will be shown.

The produced sample disc was a lamination having formed on a glass 2P substrate a $Si_3N_4$ layer, a GdFeCo layer, a TbFe layer, a TbFeCo layer and a $Si_3N_4$ layer in turn. The $Si_3N_4$ layers were 800 Å thick respectively, the GdFeCo layer was 300 Å thick, the TbFe layer was 150 Å thick, and the TbFeCo layer was 550 Å thick.

In the above sample disc, the GdFeCo layer corresponds to the playback magnetic layer, the TbFe layer to the intermediate layer, and the TbFeCo layer to the recording hold magnetic layer.

The recording was made by the magnetic field modulation on the sample disc of such structure. The laser wavelength was 780 nm, and the numerical aperture N.A. of the object lens was 0.53.

The recording linear speed was 5 m/sec. The magnetic field modulation recording was made not in the over-writing manner but after the complete erasing. The playback was made at a linear speed of 8 m/sec, a reproduction power of 3 mW, and a playback external field of 400 Oe. In this case, the recording magnetic domains of the GdFeCo layer as the playback magnetic layer were deformed while the playback was being made.

Figure 26:
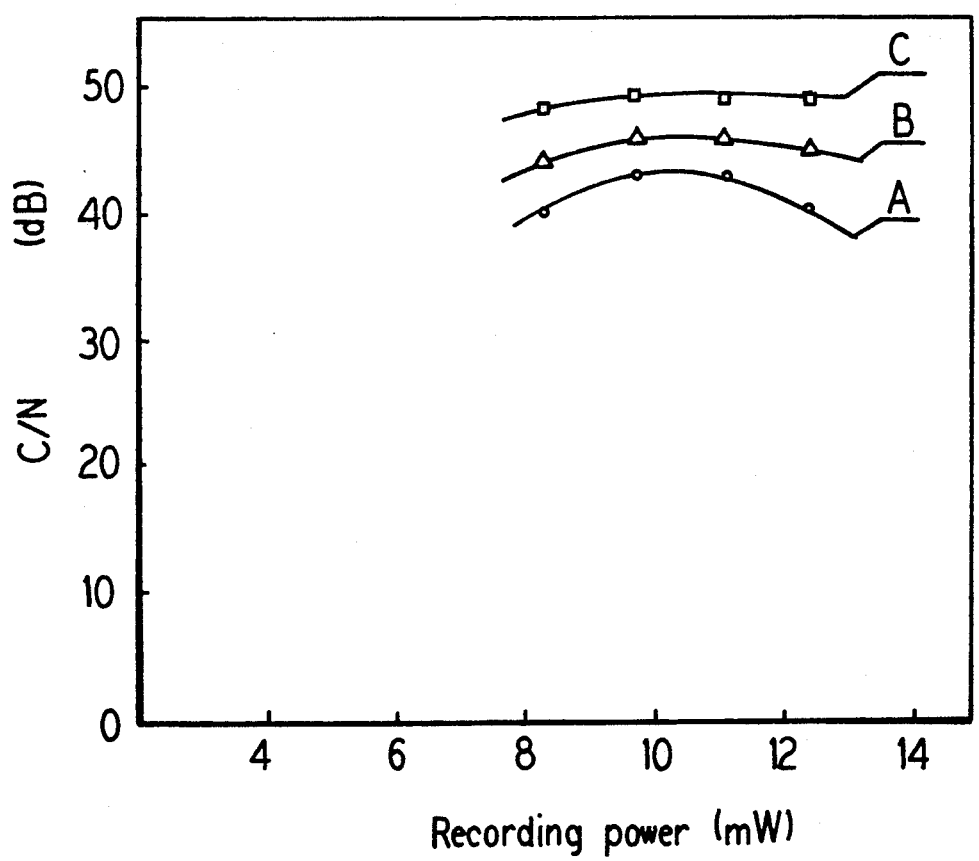
FIG. 26 is a graph showing the relation between the recording power and C/N in the case of the magnetic field modulation recording.

The relation between the recording power and C/N is shown in FIG. 26. FIG. 26 shows the relation between the recording power and C/N for the magnetic field modulation recording. The measured results are shown for each mark length (½ of the center-to-center distance of recorded pits) of 0.31 μm (curve A), 0.41 μm (curve B) and 0.52 μm (curve C).

According to this invention, the magnetization according to the recording, or information is made on the recording hold magnetic layer 2, and is read by the kerr effect in the playback magnetic layer 1. Upon playback, the playback magnetic layer 1 is initialized by the initializing magnetic field Hi, and under this condition, or in the direction in which it is magnetized in one direction, the magnetic layer is locally raised to a predetermined temperature by the playback light irradiation, so that the magnetization on the recording hold magnetic layer 2 is transferred only for the temperature-raised portion to produce the information magnetization, from which the information is read. Therefore, in addition to the improvement of the linear density the cross-talk between the adjacent tracks in the track width direction can be effectively prevented from occurring, and thus the recording density and the S/N ratio can be improved.

Further upon recording signal on the magnetooptical recording medium, both linear and track densities can be increased with improved domain shape.

We claim as our invention:

1. A method for playback of a signal from a magnetooptical recording medium, comprising the steps of:
    a) preparing a magnetic recording medium having a recording hold magnetic layer and a playback magnetic layer magnetically coupled with each other, said recording hold magnetic layer having recorded information thereon, said recorded information being represented by the direction of magnetization in said recording hold layer,
    b) applying only an initializing external magnetic field alone to the medium to initialize the magnetization of said playback magnetic layer in one direction without affecting the direction of magnetization of said recorded information in said recording hold magnetic layer,
    c) then irradiating with laser light onto said magnetooptical recording medium to locally heat the medium while applying an external magnetic field to cause transfer of the recorded information in said recording hold magnetic layer to said playback magnetic layer, to read out said recorded information by the interaction of said laser light and said transferred information.

2. A method according to claim 1, said recording hold magnetic layer and said playback magnetic layer are magnetostatically coupled.

3. A method according to claim 1, said recording hold magnetic layer and said playback magnetic layer are exchange coupled through an intermediate magnetic layer.

4. A method for recording and playback of a signal on a magnetooptical recording medium, comprising the steps of
    a) preparing a magnetic recording medium having a recording hold magnetic layer and a playback magnetic layer magnetically coupled with each other,
    b) placing recorded information on said recording hold magnetic layer by applying a recording magnetic field which is modulated according to the information being recorded, while said medium is being irradiated with a laser light, said recorded information in said recording hold layer being represented by the direction of magnetization in said recording hold layer,
    c) applying only an initializing external magnetic field alone to the medium to initialize the magnetization of said playback magnetic layer in one direction without affecting the direction of magnetization of said recorded information in said recording hold magnetic layer,
    d) then irradiating with laser light onto said magnetooptical recording medium to locally heat the medium while applying an external magnetic field to cause transfer of the recorded information in said recording hold magnetic layer to said playback magnetic layer, to read out said recorded information by the interaction of said laser light and said transferred information.

5. A method for recording and playback of a signal on a magnetooptical recording medium, comprising the steps of
    a) preparing a magnetic recording medium having a recording hold magnetic layer and a playback magnetic layer magnetically coupled with each other, and a perpendicular magnetization magnetic recording layer adjacent to said recording hold magnetic layer,
    b) placing recorded information on said perpendicular magnetization magnetic recording layer by use of a magnetic head and transferring said recorded information to said recording hold magnetic layer by irradiating said medium with laser light, said recorded information in said recording hold magnetic layer being represented by the direction of magnetization in said recording hold layer,
    c) applying only an initializing external magnetic field alone to the medium to initialize the magnetization of said playback magnetic layer in one direction without affecting the direction of magnetization of said recorded information in said recording hold magnetic layer, and
    d) then irradiating with laser light said magnetooptical recording medium to locally heat the medium while applying an external magnetic field to cause transfer of the recorded information in said recording hold magnetic layer to said playback magnetic layer, to read out said recorded information by the interaction of said laser light and said transferred information.

* * * * *